May 23, 1967  H. M. MIKAMI  3,321,322
REFRACTORY COMPOSITION AND BODY
Filed March 6, 1964  4 Sheets-Sheet 1

Inventor
Harry M. Mikami
By Shoemaker and Mattare
Attorneys

United States Patent Office

3,321,322
Patented May 23, 1967

3,321,322
REFRACTORY COMPOSITION AND BODY
Harry M. Mikami, Norristown, Pa., assignor, by mesne assignments, to International Minerals & Chemical Corporation, Skokie, Ill., a corporation of New York
Filed Mar. 6, 1964, Ser. No. 350,067
16 Claims. (Cl. 106—59)

This invention relates to a new and improved basic refractory and method of making the same.

More particularly, the invention relates to a chrome-magnesia or magnesia-chrome refractory composition and method or process with a particular object of deriving therefrom new and novel microstructural characteristics and properties.

The starting materials of the present composition (actually a range of compositions) are chrome ore consisting predominantly of the mineral chromite spinel with minor accessory silicate gangue minerals, and magnesia or periclase which consists predominantly of MgO, and it is a further object of the invention to effect an inter-action of such materials to obtain in the composition a solid solution of the spinel phase in the periclase phase.

It is a further object of the invention to produce basic refractory bricks or shapes wherein the above-stated inter-action between the materials is effected, which bricks or shapes exhibit superior bending strength at high temperatures and superior tensile strength over available or currently developed structures, due to the new and novel resulting microstructure.

It is a further object of the invention to provide a new basic refractory brick or shape from chromite spinel and periclase, according to the hereinafter described process wherein a solid state homogenization of the mineral components exists to give to the brick structure the above-stated superior properties and in addition the property of high resistance to slag penetration.

A still further object of the invention is to provide a process of producing a chrome spinel-periclase refractory wherein the temperature to which the composition is subjected is materially higher, or covers a materially greater range, than that to which previously produced refractories have been subjected, whereby the resultant product is of a different structure and possesses improved characteristics over prior refractories.

Other objects and advantages of the invention will become apparent from the following detailed description and examples and from the series of polished section photo-micrographs of the drawings, wherein:

FIG. 7 shows under ×400 magnification undissolved chromite relict in a slowly cooled specimen.

Figure 1:
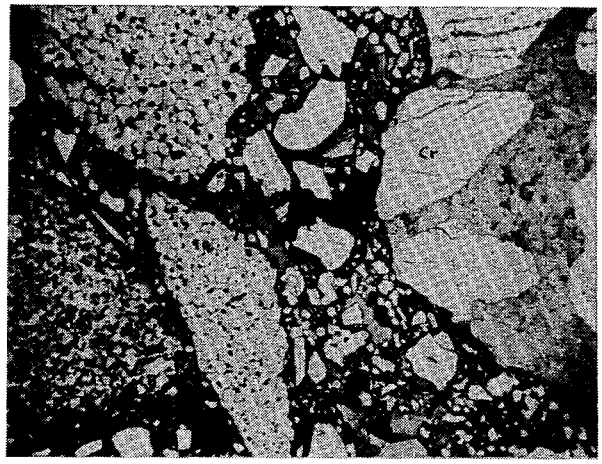
FIG. 1 shows the pressed and dried mixture of chrome ore and periclase in the unfired condition under ×50 magnification.

As hereinbefore stated, the materials of the refractory composition of the present invention are initially chrome ore consisting predominantly of the mineral chromite spinel with minor accessory silicate gangue minerals, and magnesia or periclase consisting predominantly of MgO.

The range of analyses for available chrome ores and magnesia or periclases is quite extensive, depending on the sources. The compositional tolerances are correspondingly large depending upon the methods of manufacture and ultimate conditions of applications of the products. In the present invention conditions of manufacture are such that certain limitations are placed on the compositional ranges of the starting materials as will be hereinafter set forth.

In conventional magnesia-chrome and/or chrome-magnesia refractories the magnesia phase, which is periclase, is bonded to the chromite phase by silicates developed by reaction of the magnesia with the gangue silicates of the chrome ore to orthosilicates such as forsterite and monticellite. The bonding structure is essentially a bridgework of silicate connecting and joining the predominant periclase and chromite spinel phases.

Direct bonded brick have been successfully made and used in commercial applications, as set forth in the pending patent application of H. A. Heiligman, D. G. Samuel and H. M. Mikami, Ser. No. 305,574.

In direct bonded brick the periclase and chromite spinel phases are, as the name implies, directly joined together without intervention of a silicate phase. In both the conventional silicate bonded refractory and the direct bonded refractory described in the application referred to, the principal phases, periclase and chromite spinel, have remained essentially discrete and intact during the manufacturing process. There have been relatively minor migrations and interchange of components among periclase, chromite spinel, and silicate phases. FeO in the chromite will partially oxidize to $Fe_2O_3$ and much of this will diffuse outward to combine with free MgO to form magnesioferrite. A small amount of MgO will migrate into the chromite to tend toward a re-establishment of the Ro·$R_2O_3$ balance of the spinel molecular composition. The minor accessory gangue silicates which are undersaturated with respect to MgO will melt and then react with the magnesia to form orthosilicates thereby becoming saturated with respect to MgO. While there will be more or less agglomeration and concurrent recrystallization of the fines in such refractories, depending upon the firing temperature, generally the initial shape and placement of the grains will be clearly recognizable in the resultant fired body in both silicate and direct bonded refractory compositions.

In refractories produced in accordance with the present invention, however, the inter-action of the periclase and the chromite spinel phases is carried substantially beyond the stages experienced in the preceding described refractory bodies. In the present invention, the chromite spinel phase during the high temperature processing reactions is dissolved into the periclase phase to effect a solid solution of the spinel phase in the periclase phase. This resulting solid solution phase has a crystallographic structure of the periclase type but of changed dimensions of the fundamental crystal unit cell caused by substitution of $Mg^{2+}$ cations in the orginal MgO by cations from the spinel. Periclase (MgO) has the face centered cubic close packed structure of $O^{2-}$ anions with magnesium ions in the octahedral holes each surrounded by six anions. The chromite spinel has the spinel structure which is also cubic but with a different arrangement of anions such that certain cations occupy tetrahedral sites and certain others occupy octahedral sites in which cases they are surrounded by four and six anions respectively. The cations of the chromite spinel are $Mg^{2+}$, $Fe^{2+}$, $Fe^{3+}$, $Cr^{3+}$, and $Al^{3+}$. The problem of solid solution of the chromite spinel into the MgO structure involves substitution of $Mg^{2+}$ by $Fe^{2+}$, $Fe^{3+}$, $Cr^{3+}$, and $Al^{3+}$ cations.

Ionic radii for the six-fold coordination of the involved cations are as follows: $Mg^{2+}=0.66A$; $Fe^{2+}=0.74A$; $Fe^{3+}=0.64A$; $Cr^{3+}=0.63A$; $Al^{3+}=0.51A$. $Fe^{2+}$ will cause expansion of the MgO structure; $Fe^{3+}$ and $Cr^{3+}$ will cause slight contraction, and $Al^{3+}$ will have more limited solubility and cause some contraction. The trivalent cations introduce the problem of maintaing electrical neutrality. Two trivalent cations ($Fe^{3+}$, $Cr^{3+}$, and $Al^{3+}$) substitute for three $Mg^{2+}$ ions and one cation vacancy is created so that the balance of electrical charges is maintained.

The chrome ore for the refractory composition of the present invention is one in which the mineral phase, chromite spinel, is the predominant constituent and the accompanying slicate gangue phase or phases are present in such quantity that the silica content is not, or should not exceed, preferably about 4 percent or it may be materially less. Preferably the silica content of the chrome ore should be about 3 percent or even less. There is no disadvantage and in some cases it is advantageous to use beneficated chrome ore in which gangue silicates have been removed to the extent that silica of the analysis is less than 1 percent. The grain sizing of the chrome ore is controlled by well known comminution and classification procedures to obtain the optimum packing and pressing characteristics in the bodies, bricks, or shapes into which the refractory is formed. The chromite spinel phase in available chrome ores has a wide range of compositions because of the miscibility or solid solution properties of the component oxides such that the composition is best expressed by the formula:

$$(Mg, Fe^{2+})O \cdot (Cr, Al, Fe^{3+})_2 O_3 \qquad (1)$$

The magnesia of the refractory composition is that known as periclase or refractory magnesite. The predominant oxide is MgO with minor amounts of silica, lime, iron oxide, and alumina. Periclases with from about 90 percent to about 99 percent MgO are available and usable for this invention. Preferable is periclase with MgO in the range with 96 or more percent MgO. The periclase may be the type derived from extraction from seawater or natural well brines or they may be the types obtained from mined deposits of magnesia-bearing minerals such as magnesium carbonates or hydroxides or the like.

Available chromite spinel compositions may be altered by the additions of materials such as aluminum oxide, chromium oxide, iron oxide, titanium, vanadium oxide, cobalt oxide, nickel oxide, manganese oxide, etc. as long as the cations of these oxides are the same as those already in the chromite spinel or are structurally compatible in the spinel structure. If these conditions are met they will form solid solutions with the periclase phase as will the original chromite spinel.

In carrying out the process for manufacture of the refractory composition, in accordance with the present invention, chrome ore and periclase of optimum grain sizing are mixed together in the selected proportionate quantities by weight, with appropriate temporary binders. Such binders may consist of a small amount of water and an organic binder material such as sulfite lyes, pitch, molasses, magnesium sulfate, etc., in accordance with conventional procedures well known to the art and which have been used to produce the silicate and direct bonded basic refractories hereinbefore referred to.

The mixture is blended and pressed in a mold under a pressure in excess of 10,000 p.s.i. and preferably about 20,000 p.s.i. The pressed or molded body is then dried in a suitable manner as, for example, in a suitable oven having a temperature which may be in the range of from 212° F.–237° F. These pressure and temperature figures are given merely by way of example and are not intended to be of a limiting nature.

The molded and dried bodies are then fired in a kiln to high temperature.

In the conventional previously employed procedures used to produce the silicate and direct bonded basic refractories, the temperatures used have been such so that only the silicate bonded and direct bonded microstructures have been obtained. Such temperatures in commercial kilns have been to about 3200° F. and in the laboratory to about 3300° F.

In accordance with the present improved process, it has been found that by firing the molded body to about 3400° F., a new type of microstructure begins to develop.

By firing the body of refractory material to an even higher temperature to the range of 3500° F. to 3800° F., this new microstructure is carried to virtually complete development with the result that a new and novel basic refractory composition has been formed.

Following are examples of the refractory composition of the present invention:

EXAMPLE I

A mixture was made comprising 80 percent by weight of periclase and 20 percent by weight of chromite, the ingredients having the following composition:

| Periclase | Percent | Chromite | Percent |
|---|---|---|---|
| MgO | 98.0 | $Cr_2O_3$ | 46.1 |
| CaO | 0.7 | Total Fe as FeO | 25.2 |
| $SiO_2$ | 0.6 | $Al_2O_3$ | 16.0 |
| $Fe_2O_3$ | 0.3 | MgO | 9.9 |
| $Al_2O_3$ | 0.2 | CaO | 0.1 |
|  |  | $SiO_2$ | 1.0 |

True sp. gr.—3.56.
Bulk grain density—3.30.
Grain porosity—7.3.

In the foregoing mixture, the periclase grain size distribution was adjusted to give optimum packing density. The resulting brick mix has a given sizing distribution as illustrated in the following table:

Table I

| Mesh | Percent |
|---|---|
| 4/6 | 2.0 |
| 6/8 | 12.8 |
| 8/10 | 4.2 |
| 10/20 | 14.2 |
| 20/40 | 9.0 |
| 40/100 | 19.6 |
| —100 | 38.2 |

The materials of Example I were blended and tempered with an aqueous solution of lignin sulfite to serve as a temporary binder, pressed at from 15,000 to 20,000 p.s.i., dried and fired in a fuel fired kiln. The temperature was maintained at between 3550°–3600° F. for three hours and the product was slowly cooled in the kiln to room temperature.

The porosity of the fired brick was 17.1%.

The modulus of rupture at 2300° F. was superior to conventional basic brick, being in the range of from 1600–2400 p.s.i. as against 300–500 of the conventional basic brick.

EXAMPLE II

The same periclase and chromite was used as in Example No. I, but the mixture comprised 60% periclase by weight to 40% chromite by weight.

The grain size of the chromite was essentially the same as in Example No. I. The periclase grain size was adjusted to give a mix grain sizing essentially similar to that of Example No. I, and the mix was tempered, pressed and prepared for firing and fired as in the first example.

The pressed body was fired in the fuel fired kiln at 3550°–3600° F. for 3½ hours and then slowly cooled to room temperature. The hot modulus of rupture at 2300° F. was found to be very superior being in the range of 2000–3000 p.s.i.

EXAMPLE III

For this example, the same periclase and chromite compositions were used as set forth in connection with Example No. I, but the mixture was comprised of 40% periclase and 60% chromite.

The grain size of both the chromite and the periclase was adjusted so that the mix grain size was approximately as set forth in the following table:

*Table III*

| Mesh | Percent |
| --- | --- |
| 4/6 | 1.7 |
| 6/8 | 11.2 |
| 8/10 | 4.3 |
| 10/20 | 11.3 |
| 20/40 | 7.3 |
| 40/100 | 26.2 |
| —100 | 38.0 |

The mix was prepared and otherwise treated as set forth in connection with Example No. I, and fired at 3400° F. for 3½ hours. The porosity of the fired body was 16.8% and the hot modulus of rupture at 2300° F. was 2000–3000 p.s.i.

The series of polished section photomicrographs making up the accompanying drawings illustrate the differences betwen the previously available basic magnesia-chrome and chrome-magnesia refractories and the entirely new refractory obtained by the present invention.

FIG. 1 illustrates or shows an ×50 magnification polished section of a pressed and dried brick mixture of chrome ore and periclase in the unfired condition. Attention is directed in this picture to the unreacted chrome ore gangue G. The marking Cr designates the chromite; P designates periclase, and V indicates voids.

Figure 2:
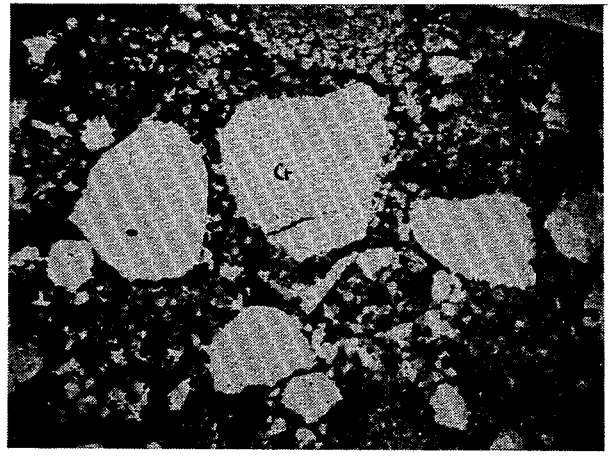
FIG. 2 shows a body of composition similar to FIG. 1 with a silicate bond under ×50 magnification.
Figure 2:
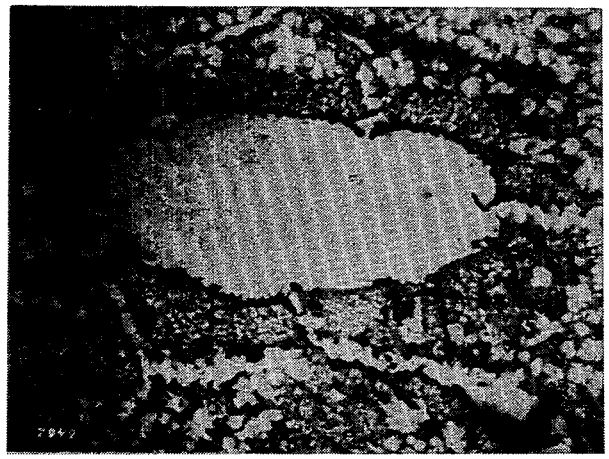

The photomicrograph forming in FIG. 2 shows a body of similar composition with a silicate bond, the silicate being designated, S. The magnification of this picture is the same as for FIG. 1.

Figure 3:
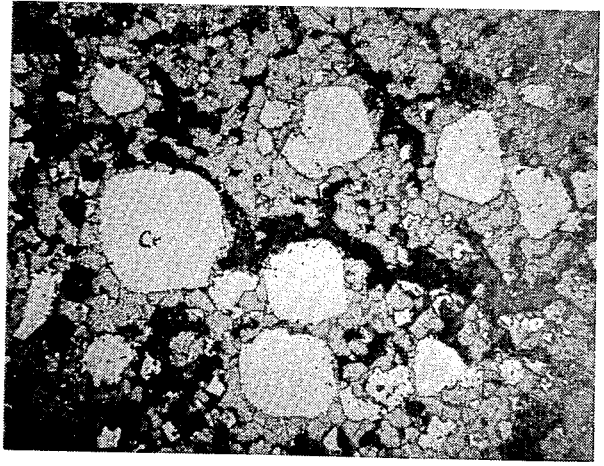
FIG. 3 shows a body also of chrome ore and periclase in which a direct bonded condition has been obtained, under ×50 magnification.

FIG. 3 illustrates, under ×50 magnification, a body also of chrome ore and periclase in which a direct bonded condition has been obtained. In these illustrations of previously available refractories, it will be seen that in each of the three bodies the bonding holding the structure together is different. The peripheral and interstitial microstructures are therefore different, but the over-all gross structures have major similarities as can be seen by comparing the three photomicrographs forming FIGS. 1, 2 and 3.

Figure 4:
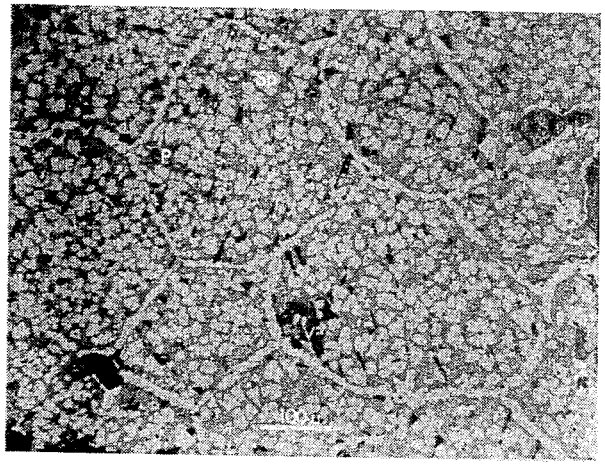
FIG. 4 shows under ×150 magnification the new microstructure obtained by the process of the present invention.

In FIG. 4, there is illustrated the new microstructure which is the essential feature of the present invention and by which the refractory of the present invention is distinguished from the preferred to prior conventional refractories. With a starting composition similar to that illustrated in FIG. 3, and treated or processed in accordance with the present invention, it will be seen that the chromite has been completely dissolved into periclase and redistributed as exsolution particles in a periclase ground-mass or matrix. Spinel, designated Sp. outlines periclase crystal boundaries. The original chromite spinel phase of the body has here been completely transformed and redistributed.

Figure 5:
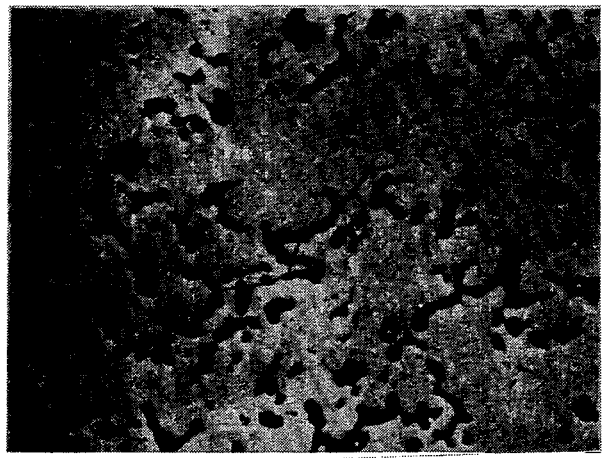
FIG. 5 shows under ×80 magnification the result of quenching in water from high temperature a sample of the same composition as that shown in FIG. 4, instead of permitting the sample to cool slowly to room temperature.

Prior to treating the pressed body according to the present process, which produced the results illustrated, or the new microstructure shown, in FIG. 4, the original pressed body before firing looked the same as the body seen in FIG. 1 but after carrying out the present process thereon, it is seen in FIG. 4 that the original chromite spinel grain shapes are no longer in existence. The mechanism by which this structural transformation and redistribution of the original chromite material was effected was through the solid solution of the original chromite spinel phase into the periclase phase to form an essentially homogeneous single solid solution phase. This solid solution phase existed in the highest temperature range of the firing process. To prove that this solid solution phase existed in the highest temperature range of the firing process, reference is made to the photomicrograph forming FIG. 5 which shows a specimen that had been quenched from a high temperature, in this instance about 3600° F., into water so that the high temperature structure was "frozen" into the body and made visible at room temperature in a metastable, non-equilibrium condition. A virtually single phase solid solution of the periclase type has resulted. In this picture the periclase solid solution is designated Pss.

In the quenched structure, a small amount of very fine submicroscopic spinel phase is present which is not discernible by the microscope but which is revealed by X-ray diffraction patterns. It is believed, however, that this phase most likely formed by exsolution during the quench because the rate of cooling cannot be sufficiently rapid to prevent a small amount of such crystallization.

It is to be understood that the invention does not involve the above-described procedure of quenching the refractory from high temperature. Such procedure has been set forth solely to show the mechanism of the reaction for developing the desired microstructure of the invention.

The process of the invention involves the procedure of slowly cooling the refractory composition from the high temperature range so that the spinel components that were in solid solution in the periclase structure phase at high temperature can exsolve under essentially equilibrium conditions to form the microstructure seen in FIG. 4.

Figure 6:
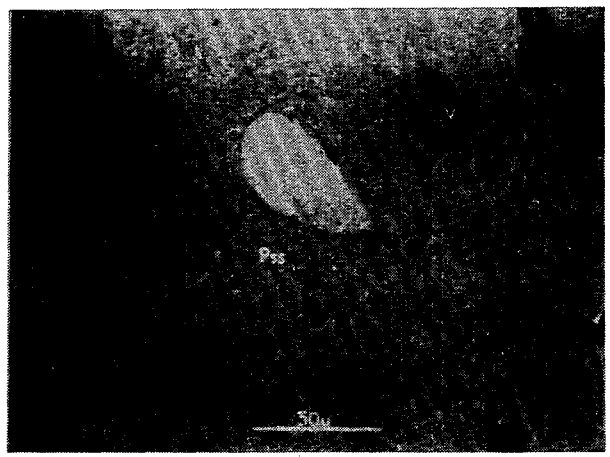
FIG. 6 illustrates under ×500 magnification another quenched sample.

In some bodies, while the predominant microstructure is that seen in FIG. 4, there may be occasional coarser chromite grains that have not been completely dissolved but remain with smoothly curved solution boundaries against the periclase as seen in the microphotograph forming FIG. 6. Here the reference letter C designates an undissolved relict of chromite. While more or less of these may occur in the material, they will not appreciably affect the properties of the material which are mainly governed by the predominant structure illustrated in FIG. 4.

While the microstructure developed by the present process resembles in some ways that occurring in some fusion cast products of similar chemical composition, it is pointed out that the present process is fundamentally different from the fusion cast process.

In the fusion cast products the chrome ore and periclase materials are melted completely to the liquid state and then cast into molds where the liquid solidifies as a solid. In the fusion cast process, there is a paragenetic order or sequence of crystallization whereby periclase and spinel phase solidify from a liquid to a solid. Although the crystallization process is not completely known it would appear that while the major phase crystallizing from the melt is a periclase solid solution there is also a spinel phase crystallizing directly from the melt. Some spinel phase will exsolve from the periclase solid solution yielding the microstructures similar to those seen in the present invention but there will also be spinel phase that crystallized directly from the melt which will differ in microstructure. Thus, it is pointed out that there are radically different processes involved whereby even the similar portions of the fusion cast microstructure was achieved. In the fusion cast product, there was complete melting to the liquid state and precipitation therefrom of the resulting phases.

In the present invention dependence is mainly placed on the solid state reactions and mechanisms whereby the spinel phase principally by solid state diffusion processes is dissolved into the periclase phase and again by essentially solid state processes it is exsolved from the periclase phase as a spinel with an entirely new shape and distribution. This solution and redistribution of the original chromite spinel does not depend on melting to the liquid state. This does not preclude the presence of minor quantities of a liquid phase during the process. Minor amounts of liquids may be present interstitial to the solid particles and may even assist in the diffusion and material transport mechanisms but it is not essential to the process. Since the refractory composition of the present invention is formed into bricks or shapes and these forms must be preserved during the process so that the dimensions and angular relationships undergo only minor changes, there must be only limited amounts of liquid generated in the body so that slumping, warping, or other objectionable deformation does not occur. In these latter respects the process is fundamentally different from the fusion cast process.

It is an advantageous feature of the instant invention that even by extremely different and divergent means, portions of the microstructure of the resulting product formed by solid state processes from beginning to end will resemble portions of the microstructure of the fusion cast product. But the macrostructure or gross structural characteristics of the present invention differ greatly from the fusion cast macrostructure much to the advantage of the instant invention. Because of the unavoidable evolution of gases during the melting and casting procedure of the fusion cast process, blow-holes, pipes, and cavities form in the solidified product such that there results a "Swiss-cheese" type macrostructure with holes of ¼, ½ or even 1 inch diameter distributed irregularly through the mass. In the present invention the pore spaces are small and uniformly distributed and part of the microstructure.

The invention as hereinbefore set forth describes the direct making of completed bricks and shapes. However, the process may be divided into two stages with certain advantages as hereinafter set forth.

In the carrying out of the two-stage process the body or shape produced in the first described procedure, which may be considered the first stage firing, need not be made or considered as a finished brick or shape, or finished product, but used as an intermediate material. This intermediate stage material has the advantage of being a pre-reacted combination of the original raw materials with the desirable solid solution-exsolution microstructure as described.

For the carrying out of the second stage of the two-stage process, the intermediate stage product is crushed, ground, and sized to the appropriate degree, mixed with more or less temporary bond and pressed or formed into bricks or shapes according to well known ceramic procedures. These bricks or shapes are then fired in kilns at temperatures in the currently conventional range or the bricks or shapes formed in the second stage can also be fired up to 3400° F. but it will not be necessary to go beyond this temperature.

The particular advantages of the two-stage process, using the product of the first stage as an intermediate material rather than as a finished product are that size and dimensional control at the first stage would not be critical. This means that less critical control of composition, sizing, temperatures, and firing rates are required and the production rate can be greatly increased. The bodies formed at the first stage may be bricks, briquettes, or even pellets or nodules in which the shape and dimensions would not be critical.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A process of making a refractory body from a granular mixture of chrome spinel and periclase which comprises forming a shaped body of the mixture, firing the body to a temperature at which the chrome spinel grains dissolve in the periclase to form a solid solution phase with a periclase type crystalline structure and cooling the body to approximately room temperature to effect exsolving a chromite spinel phase from the solid solution as crystallites, dendrites and irregular masses distributed through a host matrix periclase phase.

2. A process of making a refractory body according to claim 1, wherein the chrome spinel is comprised of a natural chrome ore consisting essentially of the mineral chromite and minor gangue silicate content such that the silica percentage is not more than 4 percent.

3. A process of making a refractory body according to claim 1, wherein the periclase has a magnesia content of at least approximately 90 percent.

4. A process of making a refractory body according to claim 1, wherein the firing temperature is in the range of from 3400° to 3800° F.

5. A process of making a refractory body according to claim 1, wherein the periclase comprises approximately 80 percent by weight with the remainder chrome spinel and wherein the firing temperature is in the range of from 3550° to 3600° F.

6. A process of making a refractory body according to claim 1, wherein the periclase comprises approximately 40 percent by weight with the remainder chrome spinel and wherein the firing temperature is approximately 3400° F.

7. A process of making a refractory body from a granular mix of chromite spinel and periclase, which comprises mixing the materials in the proportion by weight of approximately 20 percent chromite to approximately 80 percent periclase, compacting the mix with a binder into a body under a pressure of from 10,000 to 20,000 p.s.i., drying the body, then firing the body at a temperature of from 3550° to 3600° F. and thereby effect solution of the chromite spinel grains and particles for the predominant part thereof in the periclase to form a solid solution phase with a periclase type crystal structure, then slowly cooling the body to room temperature to effect exsolution from a solid solution of a chromite spinel phase as exsolute crystallites, dendrites and irregular masses distributed through a host matrix periclase phase.

8. A process of making a refractory body according to claim 7 with the further steps of reducing the body to particles, mixing said particles and compressing the same into formed bricks or shapes and finally firing such formed bricks or shapes at temperatures up to 3400° F.

9. A process of making a refractory body from a granular mix of chromite spinel and periclase, which comprises mixing the materials in the proportion by weight of approximately 60 percent chromite to approximately 40 percent periclase, compacting the mix with a binder into a body under a pressure of from 10,000 to 20,000 p.s.i., drying the body, then firing the body at a temperature of 3400° F. and thereby effect solution of the chromite spinel grains and particles for the predominant part thereof in the periclase to form a solid solution phase with a periclase type crystal structure, then slowly cooling the body to room temperature to effect exsolution from a solid solution of a chromite spinel phase as exsolute crystallites, dendrites and irregular masses distributed through a host matrix periclase phase.

10. A fired refractory body consisting of a chromite ore and periclase wherein the chromite exists as solid solution exsolute crystallites, dendrites and irregular masses distributed through a host matrix periclase.

11. A fired refractory body as defined by claim 10, wherein the periclase and chromite are in the ratio of 80 percent to 20 percent by weight and wherein the modulus of rupture at 2300° F. is in the range of from 1600 to 2400 p.s.i. and the porosity is approximately 17.1 percent.

12. A fired refractory body as defined by claim 10, wherein the periclase and chromite are in the ratio of 60 percent to 40 percent by weight and wherein the modulus of rupture at 2300° F. is in the range of from 2000 to 3000 p.s.i.

13. A fired refractory body as defined by claim 10, wherein the periclase and chromite are in the ratio of 40 percent to 60 percent by weight and wherein the modulus of rupture at 2300° F. is in the range of 2000 to 3000 p.s.i. and the porosity is approximately 16.8 percent.

14. A fired refractory body comprising chromite spinel and periclase wherein the chromite and periclase are in the ratios of from 60:40 to 20:80 percent by weight and the chromite spinel is present in a host matrix periclase phase as exsolved crystallites, dendrites and irregular masses from solid solution in the periclase phase and wherein there is a minor content of an oxide selected from the group consitsing of chromium oxide, aluminum oxide, iron oxide, titanium oxide, manganese oxide, nickel oxide, cobalt oxide, tin oxide, and vanadium oxide.

15. A process of making a refractory body from a granular mixture of chrome spinel and periclase in a chromite to periclase ratio of from 60:40 to 20:80 by weight comprising, forming a shaped body of the mixture, firing the body to a temperature at which the chrome spinel grains dissolve in the periclase to form a solid solution phase with a periclase type crystalline structure and cooling the body to approximately room temperature to effect exsolving a chromite spinel phase from the solid solution as crystallites, dendrites and irregular masses distributed through a host matrix periclase phase.

16. A process of making a refractory body from a granular mixture of chrome spinel and periclase in a chromite to periclase ratio of from 60:40 to 20:80 by weight comprising, forming a shaped body of the mixture, firing the body to a temperature fo between 3400° to 3800° F. at which chrome spinel grains dissolve in the periclase to form a solid solution phase with a periclase type crystalline structure and cooling the body to approximately room temperature to effect exsolving a chromite spinel phase from the solid solution as crystallites, dendrites and irregular masses distributed through a host matrix periclase phase.

References Cited by the Examiner
UNITED STATES PATENTS 3,180,745   4/1965   Davies _____ 106—59

TOBIAS E. LEVOW, *Primary Examiner.*

J. E. POER, *Assistant Examiner.*